(12) United States Patent
Sauermann

(10) Patent No.: US 7,447,987 B2
(45) Date of Patent: Nov. 4, 2008

(54) METHOD FOR AUTOMATICALLY POSITIONING A DATA STRING IN A COLUMN ON AN ELECTRONIC DISPLAY

(75) Inventor: Volker Sauermann, Heidelberg (DE)

(73) Assignee: SAP AG, Walldorf (DE)

( * ) Notice: Subject to any disclaimer, the term of this patent is extended or adjusted under 35 U.S.C. 154(b) by 502 days.

(21) Appl. No.: 10/850,787

(22) Filed: May 21, 2004

(65) Prior Publication Data

US 2005/0262431 A1 Nov. 24, 2005

(51) Int. Cl.
*G06F 17/00* (2006.01)
(52) U.S. Cl. .................. 715/212; 715/217; 715/227
(58) Field of Classification Search ............... 715/503, 715/504, 508, 519, 526, 530, 212, 217, 220, 715/227
See application file for complete search history.

(56) References Cited

U.S. PATENT DOCUMENTS

| 4,495,600 | A | * | 1/1985 | Kikuchi et al. ............ 712/300 |
| 5,312,478 | A | * | 5/1994 | Reed et al. ................ 715/503 |
| 5,608,625 | A | * | 3/1997 | Bailey ....................... 715/540 |
| 5,627,748 | A | * | 5/1997 | Baker et al. .............. 715/531 |
| 6,549,662 | B1 | * | 4/2003 | Kobara et al. ............. 382/229 |
| 6,820,079 | B1 | * | 11/2004 | Evans ......................... 707/4 |
| 2004/0184663 | A1 | * | 9/2004 | Akagi ......................... 382/229 |

OTHER PUBLICATIONS

Myers, Brad A., "Graphical Techniques in a Spreadsheet for Specifying User Interfaces", Proceedings of the SIGCHI Conference on Human Factors in Computing System: Reaching Through Technology, Mar. 1991, pp. 243-249.*
Hudson, Scott E., " User Interface Specification Using an Enhanced Speadsheet Model", ACM Transactions on Graphics (TOG), vol. 13, Issue 3, Jul. 1994, pp. 209-239.*
Camarda, Bill, Using Microsoft Word 97 Special Edition, Que Corporation, 1997, pp. i-ii, 13-14, 231-253.*

* cited by examiner

*Primary Examiner*—Laurie Ries
(74) *Attorney, Agent, or Firm*—Kenyon & Kenyon LLP

(57) ABSTRACT

A method and system for automatically positioning a data string in a column on an electronic display where a first distinguishable position is identified in the data string and the first distinguishable position in the data string is displayed within the visible area of the column on the electronic display. The automatic positioning occurring as a result of a change in or the initial presentation of information on the electronic display or as a result of a user interface action.

31 Claims, 5 Drawing Sheets

METHOD FOR AUTOMATICALLY POSITIONING A DATA STRING IN A COLUMN ON AN ELECTRONIC DISPLAY

FIELD OF THE INVENTION

The present invention relates to a method for automatically positioning a data string in a column on an electronic display. In various embodiments of the present invention, the positioning of the data string occurs automatically in response to a user interface action or a change in the visible data on the electronic display.

BACKGROUND OF THE INVENTION

Computer software applications often display information to a user in the form of a table or list on an electronic display. These tables may contain one or more columns of information with rows potentially containing data exceeding the width of the electronic display. In order to facilitate the display of such information, the horizontal scrolling of columns on the visible area of the display are often employed.

A common situation encountered when displaying data in a column on an electronic display is that the data in a row of the column (i.e., the data string) is often longer than the width of the column display (the portion of the column being displayed). For this reason, a horizontal scrolling mechanism is often provided to allow the rows (data strings) in the column to be scrolled so that all the contents of the data strings may be viewed and accessed.

Another situation that may be encountered involves a table or list that is wider than the visible portion of the electronic display. In this situation, all or part of the column display may not be visible. Therefore, horizontal scrolling of the columns in the table or list may also be involved.

FIG. 1 is a diagram depicting an example of a list or table that may be presented on an electronic display. The table 100 is organized in columns 110, 120, 130, 140, 150, 155, 160, 165, 170, 175 each with a column header 105 and containing rows of data 190. The intersection of a row and a column defines a data cell, the data cell containing the data from the row pertaining to the column. Each data cell may contain a string of information, hereinafter data string. For example, the data cell 192 for the third row 191 and the "Document States" column 140 (the fourth column from the left side) contains a data string with the value "synchronizing". Data strings may contain various types of information. In another example, the data cells of the "Document ID" column 110 contain data strings with path names as values.

One particular problem that may exist under certain circumstances is the inability to distinguish between the data strings based on the information in the column display. This situation may occur when the data strings are longer than the width of the column display. For example in FIG. 1, the data strings in the data cells of the "Document ID" column 110 are longer than the width of the column display. In FIG. 1, the visible portion of the data strings (i.e., the portions in the column display) of the "Document ID" column 110 are all identical. The information displayed does not allow a user to distinguish between the data strings.

FIG. 2 is diagram illustrating the distinguishable and non-distinguishable areas of two sample data strings based on the data string values shown in the data cells of the "Document ID" column 110 of FIG. 1. In FIG. 2, both the first data string 210 and the second data string 220 have a data string length "N" of 54 characters 230. The two data strings 210, 220 may be viewed as having two separate sections in relation to each other—a non-distinguishable or similar section 270 and a distinguishable or non-similar section 280. The non-distinguishable section 270 of each data string 210, 220 exists because the values for each data string position are similar to each other. The non-distinguishable section 270 covers the first 41 character positions 250 of each of the data strings 210, 220 in the example shown in FIG. 2. At position 42 260, the values for each data string 210, 220 are no longer similar (i.e., they have become distinguishable). In this example, the first data string 210 has a value of "6" at position 42 260 while the second data string 220 has a value of "7" at position 42 260. Starting at position 42 260, the remainder of each data string 210, 220 (positions 42 260 to N 230, which in this case is 54) become the distinguishable section 280 of each data string 210, 220. The potential problem inherent with the non-distinguishable sections of data strings is shown in FIG. 1.

In FIG. 1, only the initial portion of the path names are displayed and a user cannot discern which path name a data cell refers without manually scrolling the data to a distinguishable portion of the path name. Only 21 characters of the data strings are displayed in the "Document ID" column display 110. Using the sample strings 210, 220 of FIG. 2, the data strings would have be horizontally scrolled 21 more characters before a user could start to distinguish between the data strings 210, 220. Though FIGS. 1 and 2 use path names as examples, this situation may also apply to many other types of information contained in the data cells of a column.

SUMMARY OF THE INVENTION

In one embodiment of the present invention, this problem is solved by automatically positioning a data string so that the first distinguishable position on the data string is presented in the column display. In other words, a distinguishable portion of the data string is automatically made visible to the user in order to provide a more meaningful presentation of the data.

According to one embodiment of the present invention a data string in a data cell of a column may be compared to another data string in another data cell of a column to determine a first distinguishable position on the data string. The data string is then presented in the column display beginning with the first distinguishable position on the data string. If the data string is distinguishable from the other second data string beginning with the first character position, the data string may be presented in the column display beginning with the first position of the data string. If the remainder of the data string from the first distinguishable position is shorter than the width of the column display, the data string may be presented in the column display beginning with the first distinguishable position according to one embodiment of the present invention. Alternatively, it may be presented with the last position of the data string at right end of the column display (i.e., right-justified) according to another embodiment of the present invention.

The determination of the first distinguishable position can be made in various ways according to different embodiments of the present invention. In one embodiment, each position of the data string is compared to its counterpart position on the second data string beginning with the first (leftmost) position of the data string. The comparison algorithm will determine whether the values are similar or distinct (i.e., distinguishable). For example, a comparison algorithm may be case insensitive where upper and lower case values of the same character are considered similar and not distinguishable. In another example, a comparison algorithm may be case sensitive where a difference in case for the same character may make the values distinguishable. Regardless of the comparison algorithm being used, the first distinguishable position on the two data strings is where the first distinguishable values are discovered. If no distinguishable position is discovered before the end of one of the data strings, the first distinguishable position is the last position of the shorter data string in one embodiment of the present invention. In a situation where both data strings are the same length, the first distinguishable position may be the last position on both the data strings in another embodiment. In other embodiments of the present invention, other string comparison methodologies may be used.

In another embodiment of the present invention, a plurality of data strings each in its own data cell of the column may be compared to determine a first distinguishable position on the data strings. The data strings are then presented in the column display with the first distinguishable position on the data strings being visible. If the remainder from the first distinguishable position to the end of any of the data strings exceeds the width of the column display, the data strings may be presented in the column display beginning with the first distinguishable position according to one embodiment of the present invention. If all these data string remainders are equal or less than the width of the column display, the data strings may be presented with the last position of the longest data string(s) at the right end of the column display (i.e., right-justified) according to another embodiment of the present invention.

In various embodiments of the present invention, different comparison methodologies may be used to compare the plurality of data strings. For example, the position-by-position comparison described above may be used to compare all the data strings with each other according to embodiment. In another embodiment, a more complex method designed to reduce the comparison calculations may be used. According to this embodiment, a first string and second string are initially compared up to the length of the shortest data string to be compared and a first distinguishable point is determined. For example, the first distinguishable point may occur at position 20 between data strings of length 45 and 60 where the shortest of all the data strings to be compared is 25 characters long. The first string is compared with a third string until a new first distinguishable point is discovered or the existing first distinguishable position is reached. For example, if a new distinguishable position is discovered before position 20, it becomes the new first distinguishable position otherwise the comparison stops at position 20. This process continues between the first and the fourth data strings and so on until all the other data strings have been compared to the first data string and the first distinguishable position is determined. In other embodiments of the present invention, other string comparison methodologies may be used.

The example embodiments discussed herein are applied when using a language that is read from left to right as is the English language. In other embodiments of the present invention, a similar process may be applied to languages that are not read from left to right. For example, for a language that is read from right to left, the automatic positioning may begin with the rightmost character and perform calculations on leftward character positions until a first distinguishable position is found. Other embodiments may be applicable to text and languages reading upwards and downwards and even others may apply to graphical alphabets used in several Asian languages.

Exemplary embodiments of the present invention include a computer-readable medium having stored thereon instructions adapted to be executed by a processor. The processor may perform the methods described herein when executing the instructions. A non-exhaustive list of example computer readable media which may be used alone or in combination includes RAM, ROM, LEPROM, flash memory, other memory technology, CD-ROM, digital versatile disks (DYD), other optical storage, magnetic cassettes, magnetic tape, magnetic disk storage, and other magnetic storage devices. The instructions, when executed by the processor, may define a series of steps to be used for automatically positioning a data string in a column on an electronic display.

For example, in an embodiment of the present invention, a computer-readable medium may include a set of instructions adapted to be executed by a processor to implement a method for positioning a data string within a column on an electronic display. The method may include comparing a pair of data strings o be displayed in the column, identifying positions within the respective data strings in which the data strings have different content from each other, and, when a length of at least one of the data strings exceeds a width of a visible area of the column, displaying, as a function of the identifying step, a portion of each data string in the column having the column width and on the electronic display, where the portions include the positions that have the different content.

In yet another example, an embodiment of the present invention may provide a computer-readable medium that includes a set of instructions adapted to be executed on a processor to implement a method for positioning a plurality of data strings within a column on an electronic display. The method may include calculating a first distinguishable position through a comparison of the plurality of data strings, and, when a length of a data string in the plurality of data strings is greater than a width of a visible area of the column on the electronic display, displaying the plurality of data strings within the column having the visible area having the width and on the electronic display as a function of the first distinguishable position.

DETAILED DESCRIPTION

Figure 1:
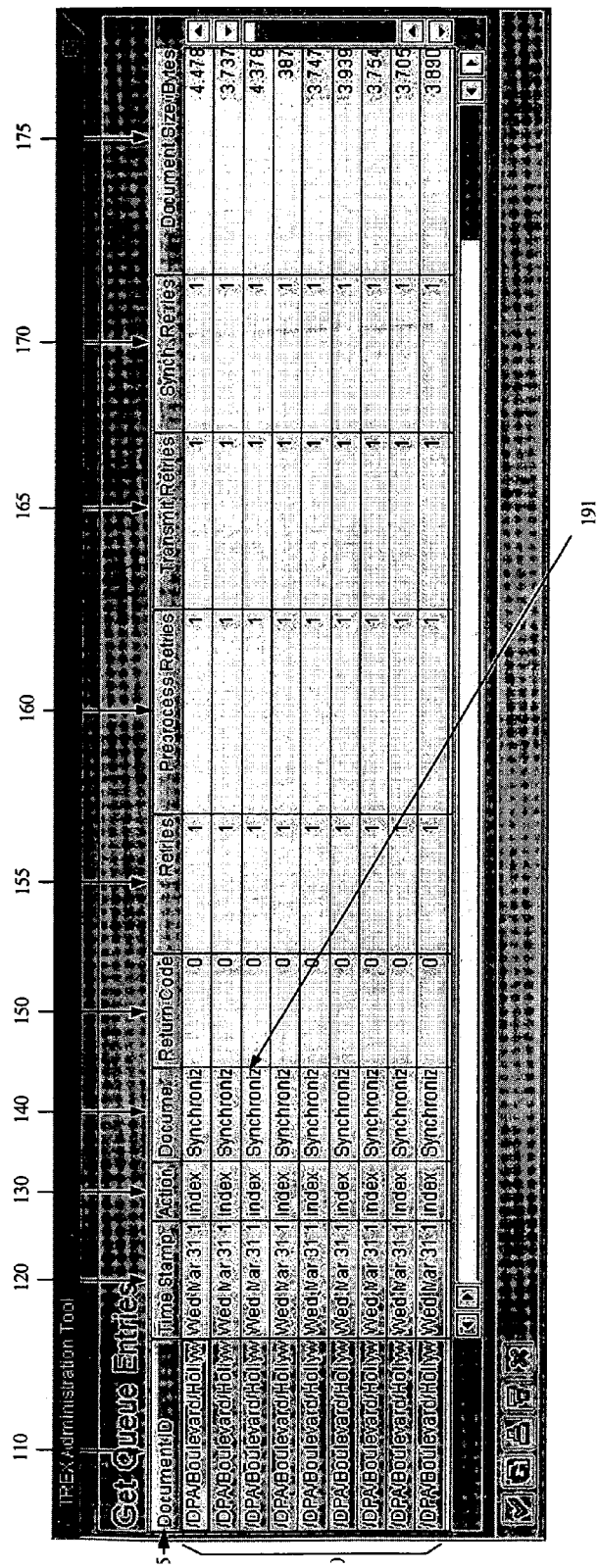
FIG. 1 is a diagram depicting an example of a table that may be presented on an electronic display.

In order to improve the presentation of information to the user, a data string may be automatically displayed so that a first distinguishable position on the data string is in the visible area of the column in a table on an electronic display according to one embodiment of the present invention. Alternatively a plurality of data strings may be automatically displayed so that a first distinguishable position on the plurality of data strings is in the visible area of a column in a table of an electronic display according to another embodiment of the present invention.

A table is composed of one or more columns typically arranged horizontally in relation with each other. Data in the table is typically organized into rows of information that span the columns. For example, the first row of information in column 1 corresponds to (i.e., is associated with) the first row of information in column 2. A data cell is the intersection between a row and a column. For example, the data in the first row corresponding to column 1 falls within the data cell for column 1 and row 1. A data cell may contain various types of information hereinafter referred to as a data string. Though the term data string is used to describe one embodiment of the present invention, the present invention may be used for other data, including graphical data and a string of graphical symbols, in other embodiments of the present invention.

A table and its associated data are typically presented and manipulated on an electronic display using software code, all or part of which may be referred to as a table control. If multiple tables are presented on an electronic display, each may have its own associated table control. In one embodiment of the present invention, the scrolling of information within a table and a column is handled by a table control. For example, vertical scrolling of rows within the table or the horizontal scrolling of a data string in a data cell of a column may be implemented and/or regulated by the table control. The automatic positioning or automatic display of the first distinguishable position of a data string or plurality of data strings may be implemented by the table control according to one embodiment of the present invention.

Automatic Positioning

The visible area of a column on the electronic display, hereinafter the "column display", is often not wide enough to fully display the data strings associated with its data cells as previously discussed. Therefore, a mechanism for scrolling of the data string within the data cells is typically available. Conventional scrolling typically requires a user action on the user interface of the electronic display (hereinafter "user interface action") specifically intended to initiate scrolling of a data string in the data cell of a column. For example, clicking on a scroll bar is a user interface action specifically intended to cause scrolling to occur. According to one embodiment of the present invention, automatic positioning is initiated without the need for any user interface action. In another embodiment of the present invention, automatic positioning of a data string may occur as a result of a user interface action not typically related to scrolling. For example, highlighting or clicking on a data cell may initiate the scrolling action. Positioning the data string without a specific user interface action occurring or when the user interface action is non-scrolling action, such as cursor positioning, is termed automatic or automatically positioning or displaying according to one embodiment of the present invention. Automatic positioning may also apply to a user interface action that is scrolling related in another embodiment of the present invention. For example, when a user first clicks on a horizontal scroll bar for a data cell, automatic positioning of the data string in the data cell may first occur before horizontal scrolling begins.

Figure 2:
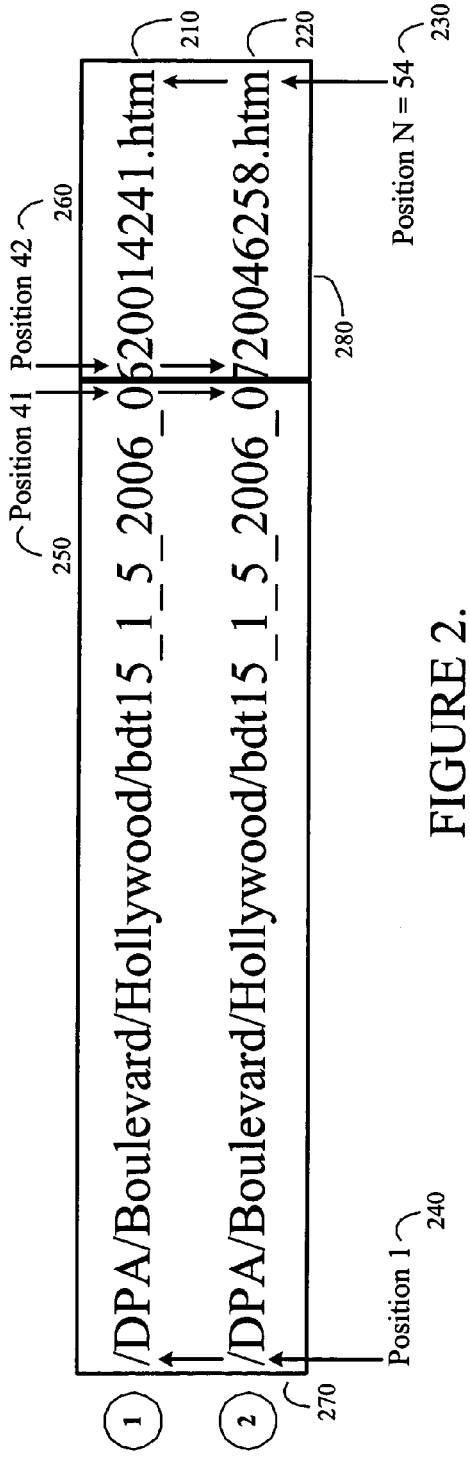
FIG. 2 is a diagram illustrating the distinguishable and non-distinguishable areas of two sample data strings.

Automatic positioning of a data string is intended to expose a first distinguishable point in the data string on the column display according to one embodiment of the present invention. FIG. 2 illustrates two strings 210, 220 both of which are 54 characters in length (N=54) 230 and are similar until position 42 260, the first distinguishable position between the two data strings. According to one embodiment of the present invention, position 42 is placed within the viewable area of the column (i.e., the column display) on the electronic display in order to facilitate the presentation of information to the user by displaying the dissimilar portion 280 of a data string. As previously discussed, in conventional usage both data strings would otherwise typically be presented in the column display beginning with the first character position 240 (i.e., left-justified) resulting in the column display containing similar information for both data strings—thereby hindering a user's ability to differentiate between the two data strings. In the example given in FIG. 2, displaying both data strings 210, 220 beginning with the first position 240 results in the presentation of identical information 270 in the column display until position 42 260 is reached, if the column display is sufficiently wide (at least 42 characters positions in width). By automatically displaying the first distinguishable position 260 of one or both data strings 210, 220 in the column display, the strings may be differentiated where the column display is 41 character positions or less in length.

Determining a First Distinguishable Position

A first distinguishable position on a data string is determined by comparing the data string with other data strings in data cells of the same column according to one embodiment of the present invention. In one embodiment, different determinations of the first distinguishable position are made depending upon whether there is only one data string, two data strings, or multiple data strings in the data cells of the column.

The example embodiments discussed herein are applied when using a language that is read from left to right as is the English language. In other embodiments of the present invention, a similar process may be applied to languages that are not read from left to right. For example, for a language that is read from right to left, the automatic positioning may begin with the rightmost character and perform calculations on leftward character positions until a first distinguishable position is found. Other embodiments may be applicable to text and languages reading upwards and downwards and even others may apply to graphical alphabets used in several Asian languages.

In a situation where only a single data string is associated with the column (i.e., only a single data cell in the column contains data), there may be different methods whereby a first distinguishable position value is determined according to various embodiments of the present invention. In one embodiment of the present invention, the first distinguishable position of the sole data string is the first position of the data string. For example, in the diagram below, position 1 of the data string having a value of "/" would be the first distinguishable position according to this embodiment of the present invention. In another embodiment of the present invention where the sole data string may contain path and file names and/or uniform/universal resource locators ("URLs"), the first distinguishable position is set to the first position of the filename. For example, in the diagram below, position 26 of the data string is the start of the filename "bdt15_1_5_2006_0620014141.htm" and the first distinguishable position would therefore become position 26 having a value of "b" according to this embodiment of the present invention. In other embodiments of the present invention, other positions on the data string may serve as the first distinguishable position for a sole data string associated with a column.

Data string:

/DPA/Boulevard/Hollywood/bdt15_1_5_2006_0620014241.htm

Data string broken down by position:

| Position: | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Data String: | / | D | P | A | / | B | o | u | l | e | v | a | r | d | / | H | o | l | l |
| Position: (Cont.) | 20 | 21 | 22 | 23 | 24 | 25 | 26 | 27 | 28 | 29 | 30 | 31 | 32 | 33 | 34 | 35 | 36 | 37 | 38 |
| Data String: (Cont.) | y | w | o | o | d | / | b | d | t | 1 | 5 | _ | 1 | _ | 5 | _ | 2 | 0 | 0 |
| Position: (Cont.) | 39 | 40 | 41 | 42 | 43 | 44 | 45 | 46 | 47 | 48 | 49 | 50 | 51 | 52 | 53 | 54 | | | |
| Data String: (Cont.) | 6 | _ | 0 | 6 | 2 | 0 | 0 | 1 | 4 | 2 | 4 | 1 | . | h | t | m | | | |

Figure 3:
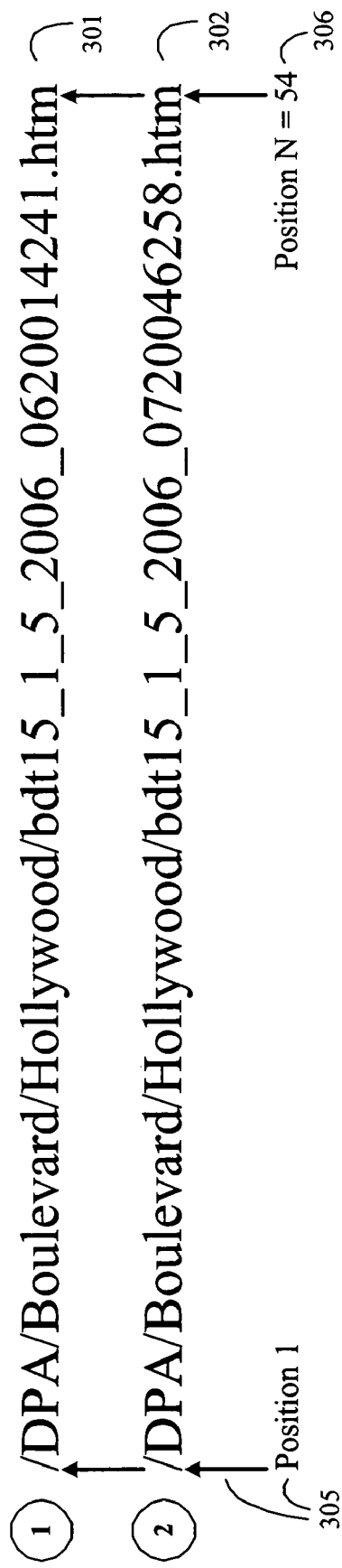
FIG. 3 is a diagram illustrating two sample data strings that may be compared according to one embodiment of the present invention.

In a situation where there are two data strings associated with a column (i.e., in the data cells of the column), a first distinguishable position may be determined by comparing a first data string with a second data string according to one embodiment of the present invention. For example, in one embodiment, each of the data strings may be considered an array similar to a string array in the C programming language. FIG. 3 is a diagram illustrating two sample data strings that may be compared according to one embodiment of the present invention. The first data string 301 and the second data string 302 in this example illustration contain the path and file name of a file. Other data strings may contain different data including, inter alia, spaces, words, sentences, punctuation, and special characters. Each data string begins at a first position 305 and ends at a last position 306 which corresponds to the length of the data string 306, in this case 54 characters for both data strings 301, 302.

A first distinguishable position may be determined for both data strings 301, 302 by comparing the first data string 301 to the second data string 302 according to one embodiment of the present invention. The comparison may be conducted by examining each of the corresponding character positions on the data strings 301, 302 until a position is found where the values are dissimilar. For the purpose of the comparison, similar values (i.e., not distinguishable values) do not need to be identical according to one embodiment of the present invention. For example, the comparison algorithm in use may identify upper and lower case of the same letter being similar and not distinguishable. Alternatively, other values may not be considered for the purpose of the data string comparison. Data values not considered by the comparison algorithm may be removed from the data string for the purpose of the comparison according to one alternative embodiment of the present invention. For example, white space (e.g., spaces) may be removed from a data string before it is compared to other data strings. Data values not considered by the comparison algorithm may be ignored for the purpose of the comparison in another embodiment of the present invention. For example, a special character as designated by the comparison algorithm in a position (e.g., position x) of one data string may cause that position (e.g., position x) not to be compared with the corresponding position on the second data string.

Figure 4:
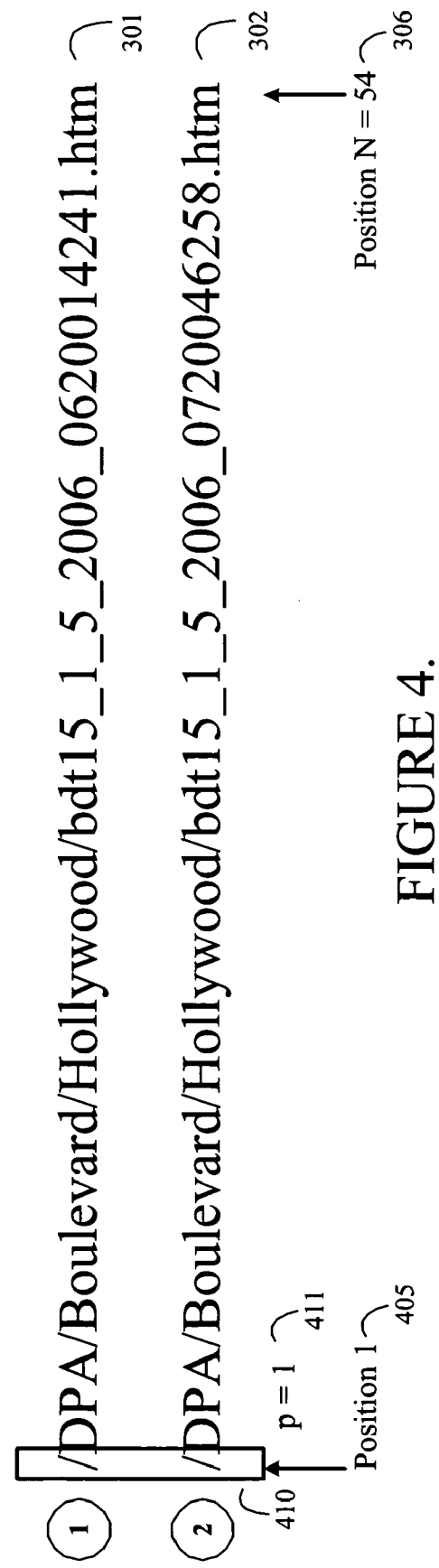
FIG. 4 is a diagram illustrating the start of a comparison of two data strings according to one embodiment of the present invention.

FIG. 4 is a diagram illustrating the start of a comparison of two data strings according to one embodiment of the present invention. A pointer "p" 411 is initialized to the first position 405 of both data strings 301, 302. The first position (i.e., position 1) 405 of both data strings 301, 302 are compared and both values are found to be similar—both are "/" slash characters—according to this embodiment. At this point, a box 410 in FIG. 4 is used to graphically depict the positions on both data strings 301, 302 that have been compared according to this example embodiment. The comparison did not find distinguishable (dissimilar) values and, therefore, the pointer p 411 is incremented to the next position, position 2.

Figure 5:
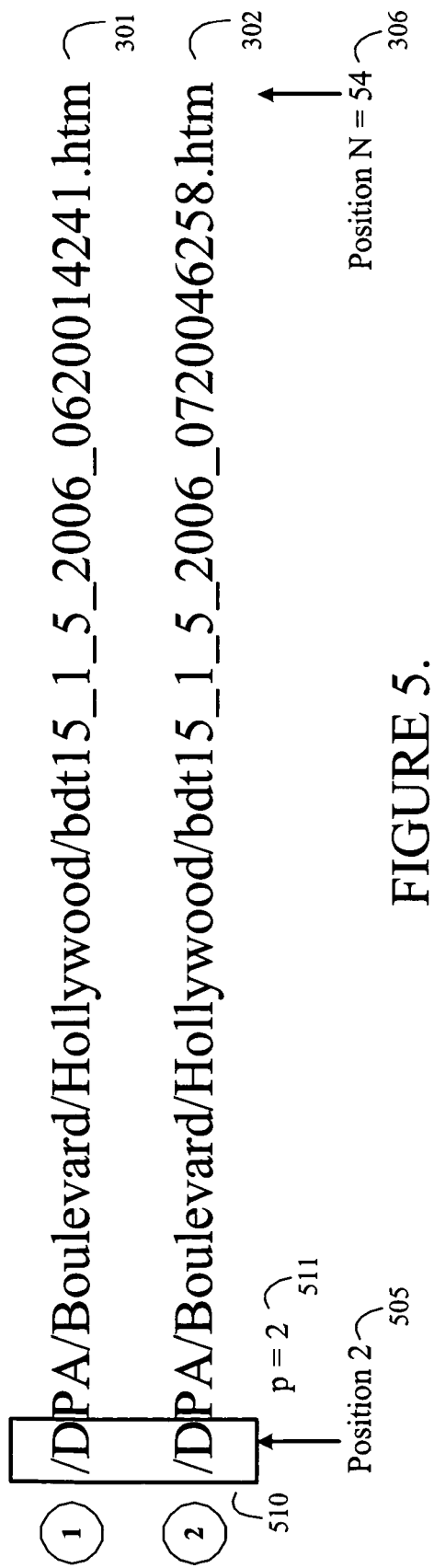
FIG. 5 is a diagram illustrating a continuation of the comparison of two data strings according to one embodiment of the present invention.

FIG. 5 is a diagram illustrating a continuation of the comparison of the two data strings according to one embodiment of the present invention. Pointer p 511 identifies the next position 505, position 2, of both data strings 301, 302 to be compared. For graphical depiction purposes, the comparison box 510 is increased to show the compared portions of the strings—including this next position. Both data strings 301, 302 have a similar value in position 2 (i.e., "D") 505 so the comparison continues. The pointer p 511 is incremented to the next position, position 3.

Figure 6:
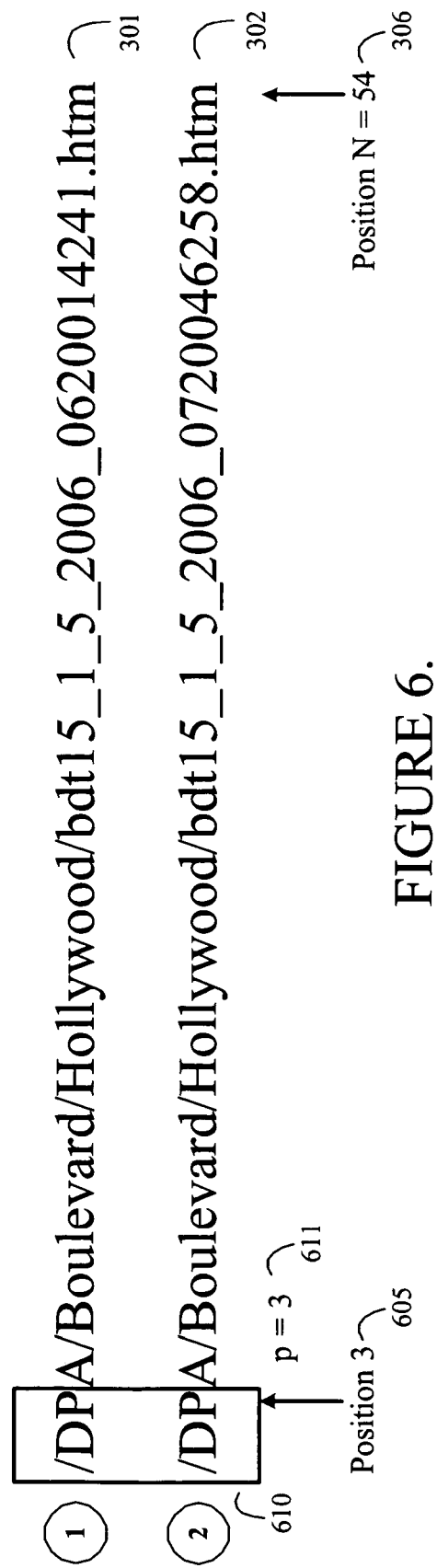
FIG. 6 is a diagram illustrating a further continuation of the comparison of two data strings according to one embodiment of the present invention.

FIG. 6 is a diagram illustrating a further continuation of the comparison of two data strings according to one embodiment of the present invention. The process continues with pointer p 611 identifying the next position 605, position 3, of both data strings 301, 302 to be compared. At position 3 605, both data strings 301, 302 again have a similar value (i.e., "P") so the comparison still continues. The comparison box 610 is adjusted to graphically depict the area on both data strings compared. The pointer p 611 is incremented and the process continues.

Figure 7:
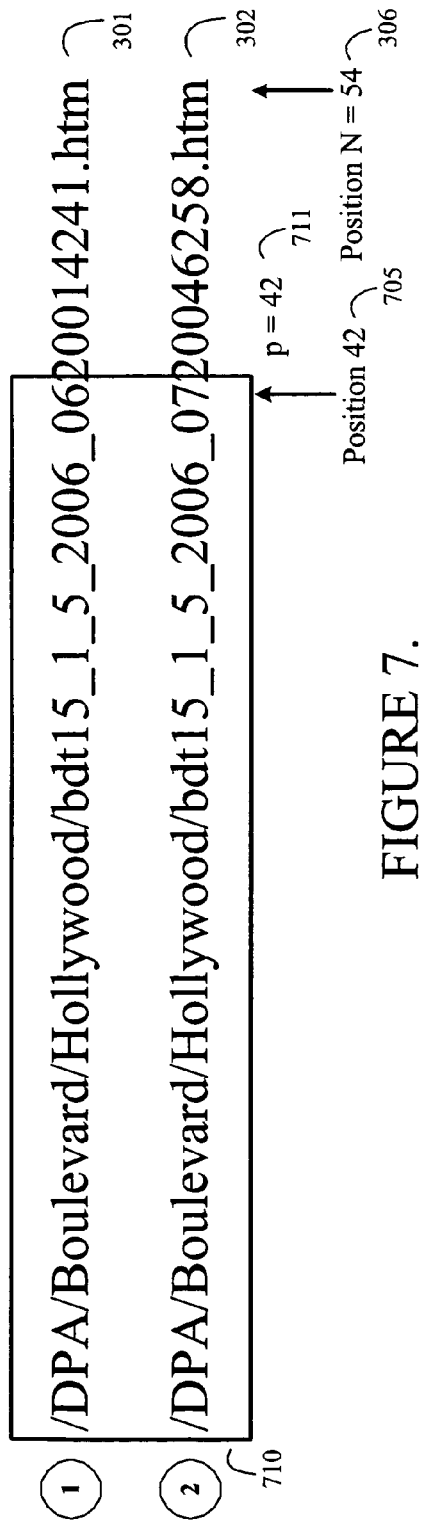
FIG. 7 is a diagram illustrating the discovery of a first distinguishable position during a comparison of two data strings according to one embodiment of the present invention.

FIG. 7 is a diagram illustrating the discovery of a first distinguishable position during a comparison of two data strings according to one embodiment of the present invention. The process continues and pointer p 711 continues to be incremented until a first distinguishable position is discovered or an end of one of the two data strings 301, 302 is encountered. In FIG. 7, pointer p 711 is incremented to 42 reflecting position 42 705 on both the data strings 301, 302. The comparison box 710 is also adjusted to graphically depict the area on both data strings compared. At position 42 705, distinct values are first encountered for both data strings 301, 302. Data string 1 301 has a value of "6" at position 42 and data string 2 302 has a value of "7" at position 42. In this example, position 42 is the first distinguishable position on the data strings 301, 302 determined as a result of the comparison according to one embodiment of the present invention.

The comparison method described in the embodiment above may not in other cases discover a first distinguishable position before reaching the end of one of the two data strings.

If the data strings are both equal in length, they may then be considered similar or not significantly distinct. In a situation where the data strings are similar, the first distinguishable position value may be set to the first position (i.e., position 1) of the data strings according to one embodiment of the present invention. In an alternative embodiment, the first distinguishable position value may be set to the last position (i.e., position N) of the data strings. In other embodiments, other values may be used where this situation occurs.

If the data strings are not equal in length and a first distinguishable position is not discovered by the end of the shorter string, the last position (i.e., position $N_s$) of the shorter data string may be used as the first distinguishable position in another embodiment of the present invention. In an alternative embodiment, the next position beyond the end of the shorter string (i.e., position $N_s+1$) is the first distinguishable position and may be used because position $N_s$ would be similar for both strings.

Figure 8:
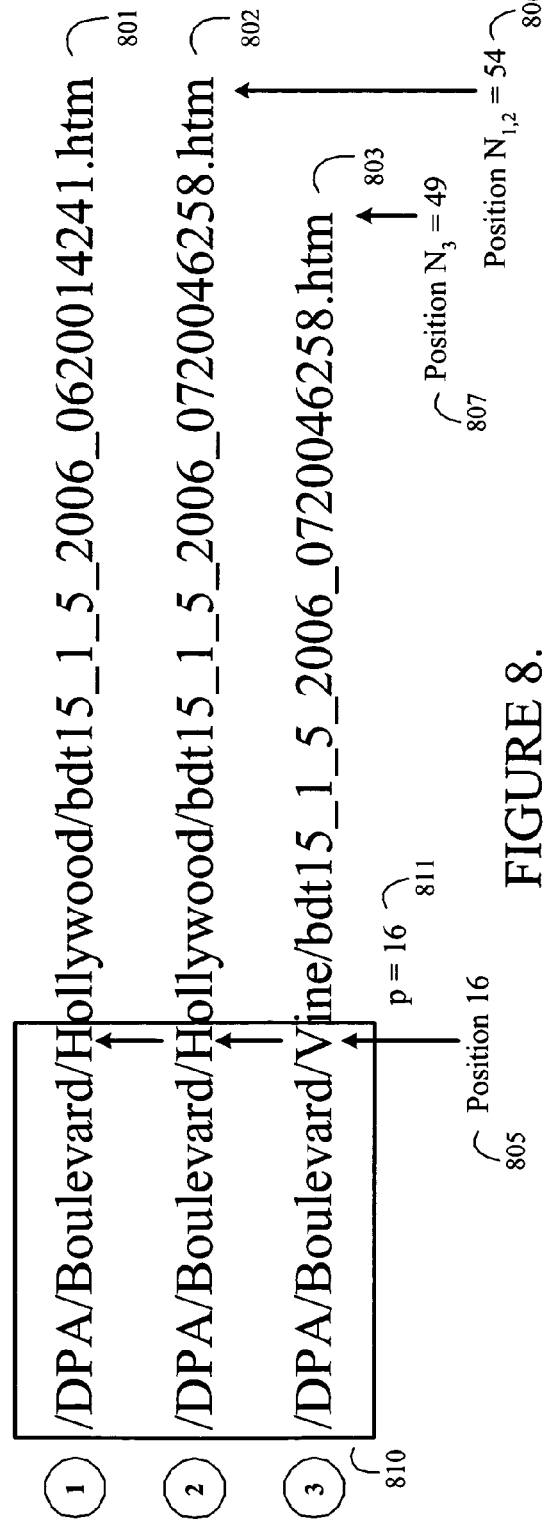
FIG. 8 is a diagram illustrating the comparison of multiple data strings according to one embodiment of the present invention.

In one embodiment of the present invention, the process described above may be used when comparing more than two data strings. According to this embodiment, a position-by-position comparison on all the data strings is conducted. FIG. 8 is a diagram illustrating the comparison of multiple data strings according to one embodiment of the present invention. In this example, three data strings 801, 802, 803 are being compared according to the process described above but this embodiment may apply to any plurality of data strings. As previously mentioned, a pointer p 811 may be used to identify the current position 805 being compared—in this case position 16 of all three data strings 801, 802, 803. The comparison box 810 graphically depicts the area on all three data strings 801, 802, 803 that have been compared. At position 16 805, the first data string 801 and the second data string 802 are similar and have the value "H" but the third data string 803 has a different value of "V". According to this embodiment of the present invention, the first distinguishable position between the data strings 801, 802, 803 is position 16 805 where the values of "H", "H", and "V" are not similar.

Figure 9:
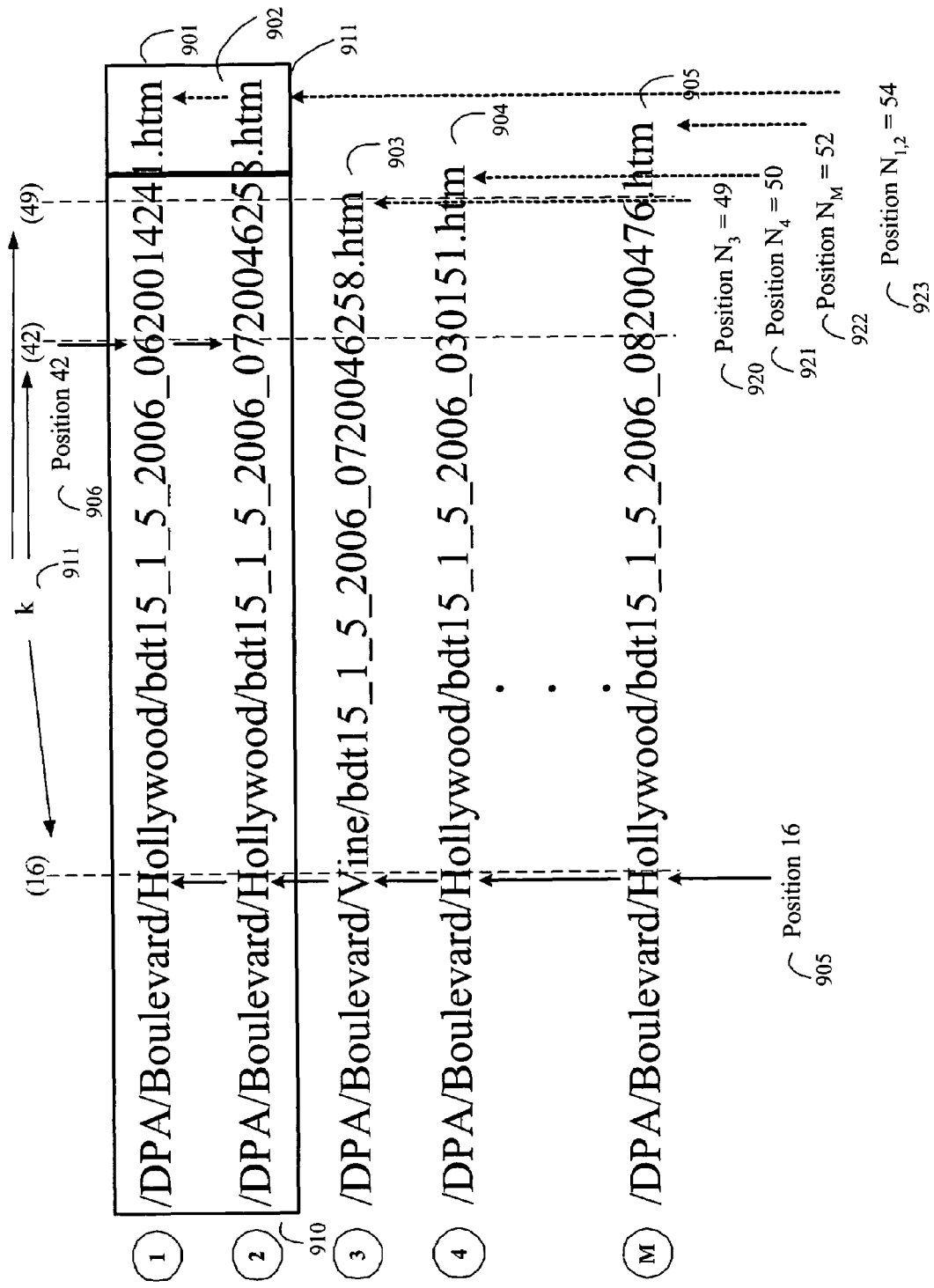
FIG. 9 is a diagram illustrating the comparison of multiple data strings according to one embodiment of the present invention.

In another embodiment of the present invention, determining the first distinguishable position between several data strings may be accomplished by performing a series of two data string comparisons as discussed above but using a method to reduce the number of positions compared for each set of two data string comparisons. There is no particular order in which the data strings need to be compared according to this embodiment. The first two data strings compared can be any of the plurality of data strings. FIG. 9 is a diagram illustrating the comparison of multiple data strings (M data strings) according to one embodiment of the present invention. This embodiment may be used to compare any plurality of data strings in the data cells of a column. According to this embodiment, a length "k" of the shortest of the plurality of data strings 920 to be compared is first determined—the shortest data string 903 has a length $N_3$ of 49, so k=49 911. Next a first data string 901 is initially compared with a second data string 902 as discussed above until a first distinguishable position between the two data strings is determined or until position k is reached. These first two strings 901, 902 correspond to the data strings 301, 302 used in the previous figures to show a further development of the string comparison process in this embodiment of the present invention. As previously mentioned, if no distinguishable position is found before position k 911, k 911 may be used as the first distinguishable position in one embodiment of the present invention. In FIG. 9, the first distinguishable position between the first data string 901 and the second data string 902 occurs at position 42 906 before position k 911 is reached. If the first distinguishable position occurred after position k (k=49) 911, only the portions of the two data strings up to position k 911 would be compared and the remainder of the strings 911 would not be compared. If a first distinguishable position is found before k (k=49) 911, k 911 is reset to this new position value (in this example, k now equals 42).

One of the already compared data strings 901, 902 is then compared with one of the yet to be compared data strings 903-905 (e.g., the third data string 903). This new comparison will only proceed until a new first distinguishable position is discovered or the new position value of k (k=42) 911 is reached according to this embodiment. In this example, a first distinguishable position is discovered at character position 16 905 before the value of k is reached (k=42) 911. As a result, k is reset from k=42 to k=16 911 according to this embodiment of the present invention.

One of the already compared data strings 901-903 is then again compared with one of the yet to be compared data strings 904-905 (e.g., the fourth data string 904) according to this embodiment of the present invention. This comparison will only proceed until a new first distinguishable position is discovered or the new position value of k (k=16) 911 is reached. In this example, the comparison of the two data strings does not discover a first distinguishable position before position k 911 is encountered. Therefore, k 911 is not adjusted and the next comparison is conducted. This process continues until all the data strings (1-M) in the plurality of data strings has been compared to one of the other data strings in the plurality of data strings. As previously stated, all these comparison between pairs of data strings will only continue until a new first distinguishable position is discovered or position k is encountered, whichever occurs first. In the case of a new first distinguishable value being discovered, the value k is reset to this position thereby shortening later comparisons. In FIG. 9, a first distinguishable position is not discovered before position 16 905 and this becomes the first distinguishable position for all the data strings according to this embodiment of the present invention.

Automatically Positioning using the First Distinguishable Position

The first distinguishable position value is used to present one or more data strings in a column display. In one embodiment of the present invention, a first distinguishable position value is only used to automatically position a single data string in a data cell of a column display. In another embodiment of the present invention, a first distinguishable position value is used to automatically position all the data strings in a column display.

If the width of the column display exceeds the length of the data strings being automatically positioned, the data strings are displayed in their entirety in the column display. If the width of the column display is narrower than the length of the data strings being automatically positioned, the data strings are automatically positioned in the column display beginning with the first distinguishable position according to one embodiment of the present invention. If the remaining length of the data strings from the first distinguishable position to the end of the data strings is less than the width of the column display, the data strings may be positioned with the last position of the data string at the right end of the column display (i.e., right-justified) according to another embodiment of the present invention. In one variation of this embodiment, all the data strings to be automatically positioned may be individually right justified in the column display. In another variation to this embodiment, the last position of the longest data string, of the data strings to be automatically positioned, is placed in the rightmost position of the column display with the other strings positioned in relation to this data string. For example, if a column display is 10 characters wide and two data strings having values of "abcd 12345" and "abcdefghijkl" are being automatically positioned, the column display will show the following values, according to this embodiment of the present invention:

cd12345
cdefghijkl

The present invention will not effect a user's ability to scroll a data string within the column display and only impacts the positioning of the data string according to one embodiment. According to this embodiment, a user can still scroll the data string to the left or right within column display as would otherwise be permitted by the user interface.

The present invention does not effect a user's ability to alter the width of the column display according to one embodiment of the present invention. When a user changes the column width of a column display implementing automatic positioning according to the present invention, at least one of the following two effects may occur in addition to the automatic positioning of the data strings according to one embodiment of the present invention:

1) the horizontal scroll bar slider (where used) changes in size to reflect the relation of the visible part of the data in the column (i.e., the column display) to all the data in the column.
2) the slider in the horizontal scroll bar (where used) is automatically positioned according to the present invention as described above.

Triggering Automatic Positioning

Automatic positioning may be triggered by the initial presentation of information on an electronic display, according to one embodiment of the present invention. According to this embodiment, when a column is first presented on an electronic display, whether as a result of new screen, scrolling, or other cause, the data strings in the column display are automatically positioned to facilitate the readability of the data by the user. Automatic positioning may also be triggered by a change in the display of information according to another embodiment of the present invention. For example, a change in information may result from the vertical scrolling of rows within a table or the horizontal scrolling of columns within a table resulting in new data becoming visible on the electronic display. In another example, a change in information may also result from resizing a table or column allowing a greater or reduced amount of information to be displayed.

Automatic positioning may be triggered by a user interface action according to another embodiment of the present invention. In one embodiment, a non-scrolling user interface action may trigger automatic positioning of a data string. For example, clicking on or highlighting a row or a data cell may trigger the automatic positioning of a data string in the data cell of a column in one embodiment of the present invention. Clicking on or highlighting a column may trigger the automatic positioning of all the data strings in that column in another embodiment. In another embodiment of the present invention, a scrolling user interface action may trigger automatic positioning of a data string. For example, if a user clicks on a horizontal scroll bar for a column, the data strings in the column may be automatically positioned before horizontal scrolling commences.

What is claimed is:

1. A method for positioning a data string within a column on an electronic display, comprising the steps of:
    comparing a pair of data strings to be displayed in the column of the electronic display;
    identifying positions within the respective data strings in which the data strings have different content from each other; and
    when a length of at least one of the data strings exceeds a column width of a visible area of the column on the electronic display, displaying, as a function of the identifying step, a portion of each data string in the column having the column width and on the electronic display, the portion including the positions that have the different content.

2. The method according to claim 1, wherein the displaying step is executed for the data strings as a function of a change in the visible area of the column on the electronic display.

3. The method according to claim 1, wherein the displaying step is executed for a particular data string as a function of making visible the data string in the visible area of the column on the electronic display.

4. The method according to claim 1, wherein the displaying step is executed for a particular data string as a function of a user interface action.

5. The method according to claim 4, wherein the user interface action comprises placing a cursor on the column on the electronic display.

6. The method according to claim 4, wherein the user interface action comprises placing a cursor on the particular data string in the column on the electronic display.

7. The method according to claim 4, wherein the user interface action comprises at least one of selecting and highlighting a section of the column on the electronic display.

8. The method according to claim 4, wherein the user interface action comprises at least one of selecting and highlighting a section of the particular data string in the column on the electronic display.

9. The method according to claim 4, wherein the user interface action comprises a horizontal scrolling on the electronic display, the horizontal scrolling altering the visible area of the column on the electronic display.

10. The method according to claim 4, wherein the user interface action comprises a vertical scrolling on the electronic display, the vertical scrolling making visible the particular data string in the column on the electronic display.

11. The method according to claim 4, wherein the user interface action comprises a vertical scrolling of the column on the electronic display, the vertical scrolling making visible the particular data string in the column of the electronic display.

12. The method according to claim 1, wherein the displaying step further comprises calculating for each of the data strings a remaining length of the data string, the remaining length calculated as a function of a first one of the identified positions and a length of the data string.

13. The method according to claim 12, wherein the displaying step further comprises, for each of the data strings, displaying the data string in the visible area of the column on the electronic display beginning with the first one of the identified positions of the data string when the remaining length is at least one of greater than and equal to the column width.

14. The method according to claim 12, wherein the displaying step further comprises, for each of the data strings, displaying the data string in the visible area of the column on the electronic display in a right-justified manner when the remaining length is at least one of less than and equal to the column width.

15. A method for positioning a data string within a column on an electronic display, comprising the steps of:
    comparing a pair of data strings to be displayed in the column of the electronic display;
    identifying positions within the respective data strings in which the data strings have different content from each other; and displaying, as a function of the identifying step, a portion of each data string in the column on the electronic display, the portion including the positions that have the different content;

wherein the comparison of the data strings further comprises a sequential comparison of matching data positions on the data strings, the sequential comparison incrementing and comparing the matching data positions on the data strings until a first dissimilar comparison result is found, the method further comprising identifying the matching data positions for the first dissimilar comparison result as a first distinguishable position for each of the data strings, wherein the displaying is performed as a function of the identified first distinguishable positions.

16. A method for positioning a data string within a column on an electronic display, comprising the steps of:

comparing a pair of data strings to be displayed in the column of the electronic display;

identifying positions within the respective data strings in which the data strings have different content from each other; and in response to resizing of the column on the electronic display, the resizing altering a visible area of the column on the electronic display, displaying, as a function of the identifying step, a portion of each data string in the column on the electronic display, the portion including the positions that have the different content.

17. A method for positioning a plurality of data strings within a column on an electronic display, comprising the steps of:

calculating a first distinguishable position, the first distinguishable position calculated through a comparison of the plurality of data strings; and when a length of a data string in the plurality of data strings is greater than a width of a visible area of the column on the electronic display, displaying the plurality of data strings within the column having the visible area having the width and on the electronic display as a function of the first distinguishable position.

18. The method according to claim 17, wherein the comparison of the plurality of data strings further comprises the steps of:

determining a shortest data string among the plurality of data strings;

setting a value of a comparison variable to equal the length of the shortest data string;

performing, for each data string in the plurality of data strings, the steps of:

i. comparing the data string with an other data string in the plurality of data strings, the comparing step beginning with a first position of the data string and the other data string and continuing until a comparison end value is encountered, the comparison end value corresponding to the first encountered of at least one of a first position where a first dissimilar value is found and a second position corresponding to the comparison variable, and ii. setting the comparison variable equal to the comparison end value; and setting the first distinguishable position equal to the comparison variable, the setting the first distinguishable position step occurring after the performing step.

19. The method according to claim 17, wherein the displaying step further comprises:

displaying the plurality of data strings in the column on the electronic display as a function of the first distinguishable position, the displaying step initiated as a function of a change in a visible area of the column on the electronic display.

20. The method according to claim 19, wherein the change is a result of a resizing of the column on the electronic display.

21. The method according to claim 19, wherein the change is a result of a scrolling of the column on the electronic display.

22. The method according to claim 17, wherein the displaying step further comprises:

displaying the plurality of data strings in the column on the electronic display as a function of the first distinguishable position, the displaying step initiated as a function of a change in the plurality of data strings displayed in a visible area of the column on the electronic display.

23. The method according to claim 22, wherein the change is a result of a vertical scrolling in the column on the electronic display.

24. The method according to claim 17, wherein the displaying step is executed as a function of initially displaying the column on the electronic display.

25. The method according to claim 17, wherein the displaying step is executed as a function of a user interface action.

26. The method according to claim 25, wherein the user interface action comprises at least one of placing a cursor on the column on the electronic display and placing the cursor on a data string in the column on the electronic display.

27. The method according to claim 25, wherein the user interface action comprises at least one of a horizontal scrolling and a vertical scrolling, the at least one horizontal scrolling and vertical scrolling altering a visible area of the column on the electronic display.

28. A method for positioning a plurality of data strings within a column on an electronic display, comprising the steps of:

calculating a first distinguishable position, the first distinguishable position calculated through a comparison of the plurality of data strings; and displaying the plurality of data strings within the column on the electronic display as a function of the first distinguishable position;

wherein the comparison of the plurality of data strings further comprises a sequential comparison of a matching data position on the plurality of data strings, the sequential comparison incrementing and comparing the matching data position on the plurality of data strings until a first dissimilar comparison result is found, the first distinguishable position calculated as the matching data position for the first dissimilar comparison result.

29. A computer-readable medium containing a set of instructions adapted to be executed on a processor to implement a method for positioning a data string within a column on an electronic display, the method comprising the steps of:

comparing a pair of data strings to be displayed in the column of the electronic display;

identifying positions within the respective data strings in which the data strings have different content from each other; and when a length of at least one of the data strings exceeds a column width of a visible area of the column on the electronic display, displaying, as a function of the identifying step, a portion of each data string in the column having the column width and on the electronic display, the portion including the positions that have the different content.

30. A computer-readable medium containing a set of instructions adapted to be executed on a processor to implement a method for positioning a plurality of data strings within a column on an electronic display, the method comprising the steps of:

calculating a first distinguishable position, the first distinguishable position calculated through a comparison of the plurality of data strings; and when a length of a data string in the plurality of data strings is greater than a width of a visible area of the column on the electronic display, displaying the plurality of data strings within the column having the visible area having the width and on the electronic display as a function of the first distinguishable position.

31. A method for positioning a data string within a column on an electronic display, the column having a width that is too narrow to permit full display of the data string, comprising the steps of:

comparing content of a first data string that cannot be fully displayed with a preceding data string;

designating character positions in the first data string as distinguishable sections when content of the character positions differs with corresponding content of the preceding data string; and displaying a portion of the first data string in the column having the width and on the electronic display, the portion including a distinguishable section.

\* \* \* \* \*